(No Model.)
A. W. MARSHALL.
ICE CAVE OR APPARATUS FOR FREEZING SOUFFLÉS AND MOLDING ICE PUDDINGS, &c.
No. 322,117. Patented July 14, 1885.
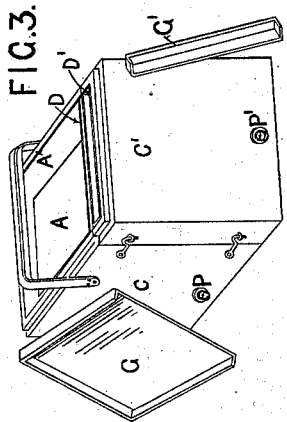
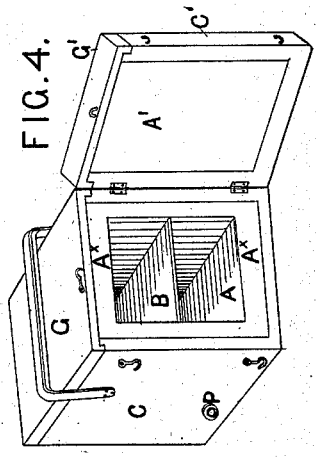
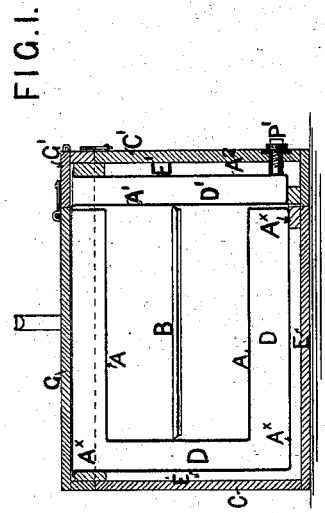
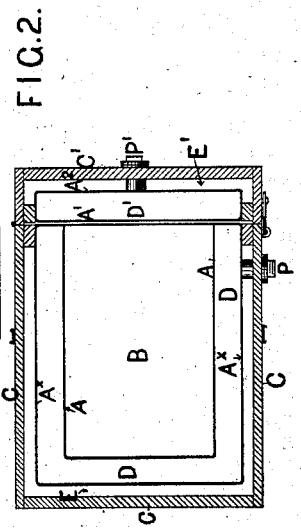
Witnesses
Chas H Smith
J. Staib
Inventor
Alfred W. Marshall
per Lemuel W. Serrell
Atty

UNITED STATES PATENT OFFICE.

ALFRED W. MARSHALL, OF MORTIMER STREET, CAVENDISH SQUARE, COUNTY OF MIDDLESEX, ENGLAND.

ICE-CAVE OR APPARATUS FOR FREEZING SOUFFLÉS AND MOLDING ICE-PUDDINGS, &c.

SPECIFICATION forming part of Letters Patent No. 322,117, dated July 14, 1885.

Application filed April 17, 1885. (No model.) Patented in England September 30, 1884, No. 13,007.

*To all whom it may concern:*

Be it known that I, ALFRED WILLIAM MARSHALL, subject of the Queen of Great Britain, residing at Mortimer street, Cavendish Square, in the county of Middlesex, England, have invented certain new and useful Improvements in Ice-Caves or Apparatus for Freezing Soufflés and Molding Ice-Puddings and the like; also applicable as an ice-safe, and for keeping food or drink at a low or high temperature, of which the following is a specification.

Up to the present time the molding of ice-puddings and the like has been effected by using molds, which are made to entirely surround the mixture required to be made into a shape, and to lute with grease or some equivalent every crack and joint of the mold, and then to place the mold into a pail or tub and surround the mold with a freezing mixture, such as a mixture of ice and salt. By my invention I do entirely away with the necessity for specially-designed molds, and avoid the use of grease or other luting material, and prevent all possibility of brine entering the mold. It also enables the operator to examine the process from time to time; also enables the ice when molded to be kept ready and be turned out for use at any moment, and also to keep or preserve any part of the ice not used.

Figure 1 of the accompanying drawings is a vertical section through my ice-cave; Fig. 2, a horizontal section through the same; Fig. 3, a perspective view, with the two-parted top lid removed, so that the freezing mixture may be put in; and Fig. 4, a perspective view of the apparatus as it will appear when charged and ready for use.

I provide an internal metal cave or cupboard, A, with one or more shelves, B, across, if desired, and surrounded by another vessel or casing, A$^\times$, so that in the space D between the two a layer of ice and salt can be maintained, producing in the internal cave a very low degree of temperature. An intermediate air-space, E, is formed between the casing A$^\times$ and its exterior part, C, which latter is made of wood or other non-conductor for protection against atmospheric influence, thereby making a cold more intense and lasting in the inner cave or cupboard, in which are put the ice-puddings, soufflés, or other materials required to be frozen, set in shape, or cooled; or, if the food or drink is to be kept hot in the cave, I charge the spaces D and D' with hot water instead of freezing mixture.

The front door of the cave or cupboard is also formed with double walls A' and A$^2$, leaving an interior or intermediate space, D', for freezing mixture. This space is filled from the top, and there closed by a sliding or other lid, G'. The door is also formed with intermediate air-space E' between the wall A$^2$ and its outer face or wall, C', which latter is of wood or other non-conductor like the other parts of the outer casing.

The top of the apparatus is closed by a sliding or other lid, G, made of (or covered with) wood or other non-conductor, and which may also be formed with intermediate air-space.

The joints at the door and at the lids should be kept tight by means of flannel, or the like, to exclude the air. P and P' are plugs for letting out the water from the compartments D and D'.

I claim—

A freezing-cave or ice-safe or hot safe, consisting of an inner cupboard with hollow walls A A$^\times$, and door with hollow walls A' A$^2$, the intermediate spaces, D and D', containing freezing mixture, (or hot water,) and being accessible by lids G and G', the said cupboard and door being provided with outer wall, C and C', and intermediate air-spaces, E and E', all substantially as set forth.

A. W. MARSHALL.

Witnesses:
 JNO. DEAN,
  17 *Gracechurch Street, London.*
 CLAUDE WOODROW,
  31 *Lombard Street, London.*